United States Patent [19]

Huntley

[11] Patent Number: 5,101,933
[45] Date of Patent: Apr. 7, 1992

[54] TREE STAND WITH STORE AWAY SEAT

[76] Inventor: George E. Huntley, 105 Lake View Dr., Wadesboro, N.C. 28170

[21] Appl. No.: 400,483

[22] Filed: Aug. 17, 1989

[51] Int. Cl.$^5$ .............................................. A47C 9/00
[52] U.S. Cl. ..................................... 182/187; 182/136
[58] Field of Search ............... 182/187, 188, 133, 134, 182/135, 136; 248/108, 236

[56] References Cited

U.S. PATENT DOCUMENTS

| | | | |
|---|---|---|---|
| 2,678,243 | 5/1954 | Masse | 248/236 X |
| 3,960,240 | 6/1976 | Cotton | 182/187 X |
| 4,129,198 | 12/1978 | Hunter | 182/187 |
| 4,137,995 | 2/1979 | Fonte | 182/135 |
| 4,321,983 | 3/1982 | Nelson | 182/188 X |
| 4,331,216 | 5/1982 | Amacker | 182/187 X |
| 4,369,858 | 1/1983 | Babb | 182/187 X |

FOREIGN PATENT DOCUMENTS 14416 11/1902 Austria ................................. 182/187

*Primary Examiner*—Karen J. Chotkowski
*Attorney, Agent, or Firm*—A. Milton Cornwell, Jr.

[57] ABSTRACT

A tree stand having improved comfort and utility features a unique seat design enabling the hunter to move the seat a confined distance while seated thereon and to swing the seat out of the way to the side of the stand if desired.

1 Claim, 3 Drawing Sheets

TREE STAND WITH STORE AWAY SEAT

BACKGROUND OF THE INVENTION

This invention relates to tree climbing apparatus for use by hunters and, more particularly, to a tree stand designed for improved comfort and convenience by featuring a fold away seat which is adjustable for user comfort.

Many tree stands of various design are known in the prior art. In general, they consist of a platform used to stand or sit on with or without an auxiliary seat and a foot climber used for elevating the platform to the desired height. These seats can also be used as a back rest or shooting support table by changing their position on the platform. Such seats are permanently attached to the platform and pivot forward and backward or must be positioned by removal of bolts or clips. Typical of patents on platform and seat combinations are U.S. Pat. No. 4,236,602 to Leggett; U.S. Pat. No. 4,369,858 to Babb; U.S. Pat. No. 4,417,645 to Untz and U.S. Pat. No. 4,452,338 to Untz. None of these patents allow the user to move the seat out of the way while at the same time keeping it attached to the main platform.

SUMMARY OF THE INVENTION

This invention provides a tree stand with improved quiet, comfort and utility. It features a unique seat design which enables the hunter to move the seat forward and backward a confined distance while seated. The seat is also designed so that it can easily be folded to the external side of the tree stand platform when desired. The seat is attached to the platform with means for horizontal sliding motion of the seat and for positioning the seat in a verticle alignment on the outside of the platform.

DESCRIPTION OF THE PREFERRED EMBODIMENTS

Figure 1:
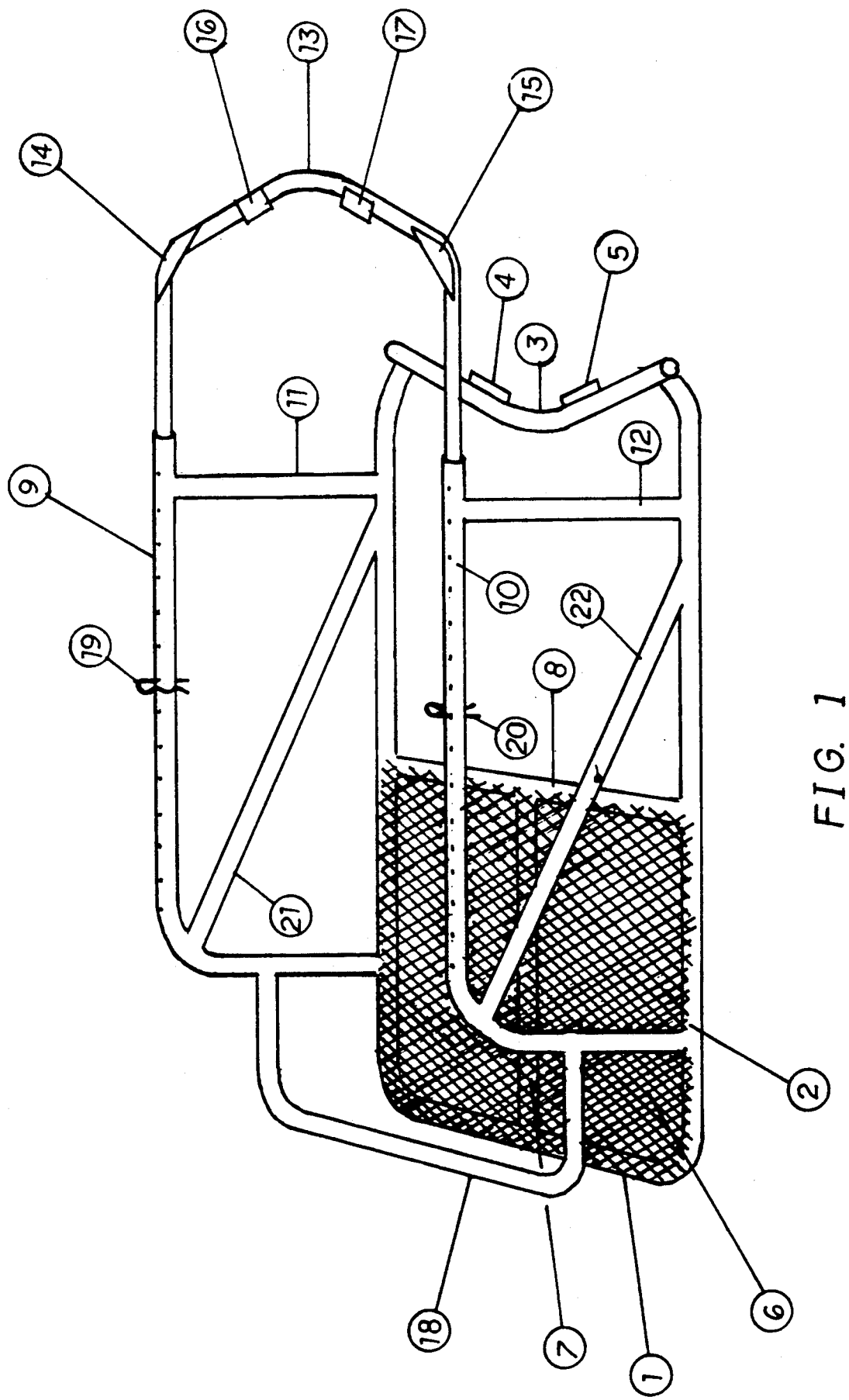
FIG. 1 is a perspective view of the tree climbing main platform with raised rails.

Referring now to the accompanying drawings, FIG. 1 comprises main stand platform 1 including base frame 2 of generally rectangular shape and adapted at one end for attachment of half moon gripper bar 3 on which gripper blades 4 and 5 are fixed and positioned for engagement with the tree. Base frame platform 6 is joined to base frame 2 and supported by parallel support bar 7 and perpendicular support bar 8. Raised rigid rails 9 and 10 are fastened to base frame 2 and reinforced with support posts 11 and 12. Half hexagon gripper bar 13 is shaped for telescopic insertion in the open ends of raised rigid rails 9 and 10 and includes corner stress plates 14 and 15 and gripper blades 16 and 17 positioned for engagement with the tree. Curved back rest bar 18 is attached and positioned about at the midpoint of the verticle portion of the raised rigid rails and may be padded for extra comfort. A pair of clip pins 19 and 20 are inserted through raised rigid rails 9 and 10 for holding and adjusting half hexagon gripper bar 13 against the tree. Rigid rails 9 and 10 are further supported by stress bars 21 and 22 positioned at a 45° angle.

Figure 2:
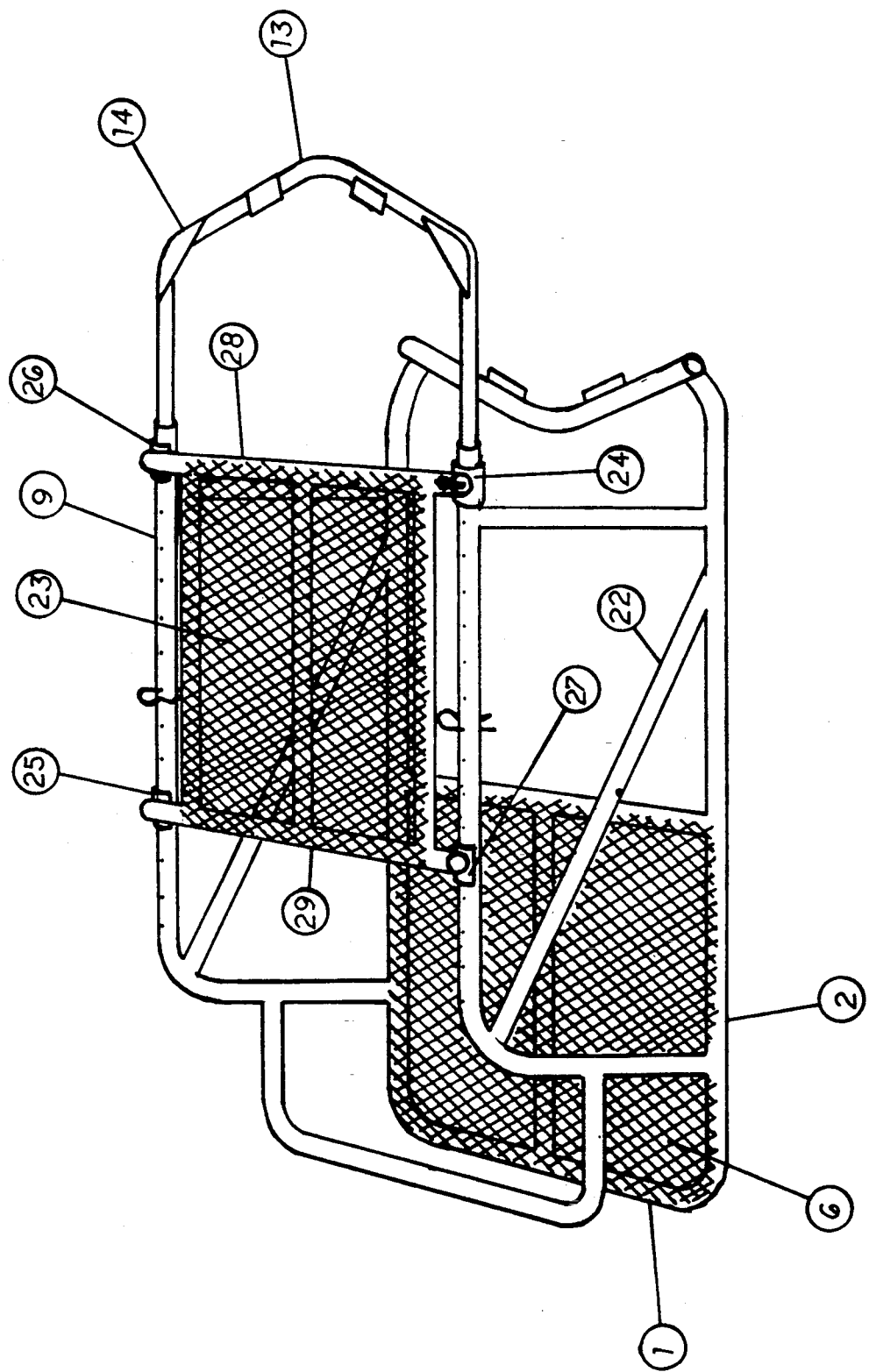
FIG. 2 is another perspective view showing the swing away seat in position for use.

In FIG. 2, swing away seat 23 is shown in position for use resting on top of raised rigid rails 9 and 10. Seat swivel collar 24 is fastened to swing away seat 23 at one corner adjacent half hexagon gripper bar 13 with U-shaped half collars 25, 26 and 27 positioned at the remaining three corners of swing away seat 23 on seat support rails 28 and 29 and with their open ends down to permit swing away seat to be moved forward toward the tree or backward away from the tree while the hunter is seated thereon. Movement of swing away seat 23 is normally confined to a distance of about four inches, (10.16 centimeters), this being the area between corner stress plate 14 and support post 11. The exact movement distance will, of course, vary with the dimensions of main stand platform 1. Thus the hunter is able to shift his position from time to time while seated for long periods of time, enabling him to relieve muscular tension.

Figure 3:
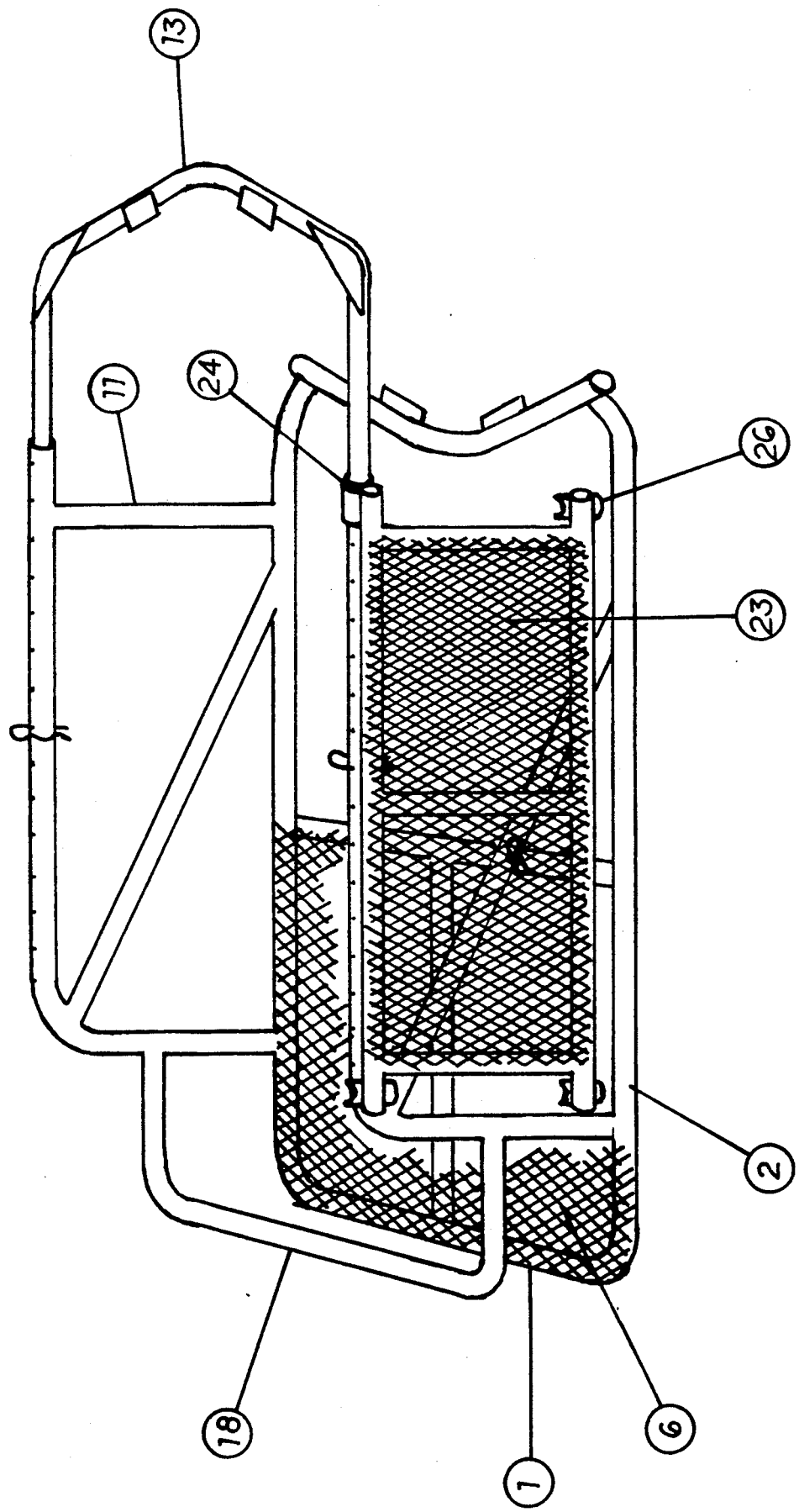
FIG. 3 shows the swing away seat in the folded position on the side of the main platform.

FIG. 3 shows swing away seat 23 in its storage position on main stand platform 1 suspended from raised rigid rail 9 and attached thereto by swivel collar 24 and anchored to raised rigid rail 9 by wing nuts.

The tree stand is specifically designed for comfort and quietness. Known tree stands have seats that cannot move once the hunter is seated thereon and this gets very uncomfortable after one has been sitting for 3 or 4 hours trying to keep quiet. The seat design of this invention enables the hunter to quietly slide the seat back and forth to relieve muscular tension while seated thereon. The seat will slide backward or forward a distance of about four inches (10.16 centimeters) or more depending on design dimensions.

Although the invention has been described with respect to preferred embodiments, it is not to be so limited since various alterations, changes, deviations, modifications and departures may be made by those skilled in the art to the embodiments shown, and are within the spirit and intended scope of the present invention.

I claim:

1. In a tree-climbing apparatus comprising a platform with side support rails and adapted for gripping a tree and a foot climber, the improvement characterized in that a swing-away seat is attached to the platform in a horizontal in-use position with U-shaped half collars positioned at three corners of said seat for horizontal sliding motion of the seat along the support rails while the user of the apparatus is seated thereon and a swivel collar attached at one corner of said seat completely encircling one of the side support rails on said platform for positioning the seat in a vertical alignment to the outside of the platform in a store position.

* * * * *